(12) United States Patent
Moug et al.

(10) Patent No.: US 10,730,279 B2
(45) Date of Patent: Aug. 4, 2020

(54) HAND HELD CIRCULAR HEATING ELEMENTS

(71) Applicant: Pacific Coast Building Products, Inc., Rancho Cordova, CA (US)

(72) Inventors: Joseph Carlton Moug, Santa Rosa, CA (US); Paul Edwin Boney, Salida, CA (US); Arthur Ralph Gardner, Pleasanton, CA (US); Christopher Joseph Bueno, San Leandro, CA (US); Jose Arturo Bueno, San Lorenzo, CA (US)

(73) Assignee: Pacific Coast Building Products, Inc., Rancho Cordova, CA (US)

( * ) Notice: Subject to any disclaimer, the term of this patent is extended or adjusted under 35 U.S.C. 154(b) by 154 days.

(21) Appl. No.: 14/694,711

(22) Filed: Apr. 23, 2015

(65) Prior Publication Data
US 2016/0316517 A1 Oct. 27, 2016

(51) Int. Cl.
| | | |
|---|---|---|
| *B23K 3/00* | (2006.01) | |
| *B32B 43/00* | (2006.01) | |
| *F24H 3/04* | (2006.01) | |
| *H05B 3/06* | (2006.01) | |

(52) U.S. Cl.
CPC ......... *B32B 43/006* (2013.01); *F24H 3/0423* (2013.01); *H05B 3/06* (2013.01); *H05B 2203/03* (2013.01)

(58) Field of Classification Search
CPC ...... B23K 3/03; B23K 3/0346; B23K 3/0353; B23K 3/0361; B23K 3/0369

USPC ........ 219/481, 482, 238, 229, 240, 236, 227
See application file for complete search history.

(56) References Cited

U.S. PATENT DOCUMENTS

| | | | | | |
|---|---|---|---|---|---|
| 2,763,762 | A | * | 9/1956 | Jepson | A01K 17/00 219/231 |
| 3,271,555 | A | * | 9/1966 | Hirshon | H01L 21/67144 219/236 |
| 3,319,037 | A | * | 5/1967 | Stein | B23K 1/002 174/102 R |
| 4,205,221 | A | * | 5/1980 | Meyer | B23K 1/012 165/61 |
| 4,208,571 | A | * | 6/1980 | Moumaneix | B23K 3/0361 156/579 |
| 4,552,124 | A | * | 11/1985 | Nakajima | B23K 3/023 126/413 |
| 4,602,143 | A | * | 7/1986 | Mack | A45D 1/28 132/232 |
| 5,095,639 | A | * | 3/1992 | Slavin, Jr. | B32B 17/10963 156/94 |

(Continued)

*Primary Examiner* — Lorne E Meade
*Assistant Examiner* — Ayub A Maye
(74) *Attorney, Agent, or Firm* — Sheppard, Mullin, Richter & Hampton LLP

(57) ABSTRACT

A device that is a handheld circular heating element for use in the construction industry is described. Specifically the device is useful for applying heat uniformly to a two-piece membrane for separation of the outer layer to allow the inner layer to be exposed. The device includes a handle, an electrical supply, an on/off switch and a heating element. The device uses electricity to heat the heat-emitting burner of the heating element, which is then placed next to the membrane. As the membrane is warmed, the two layers of the membrane are able to be separated, which exposes the inner membrane.

12 Claims, 4 Drawing Sheets

(56) References Cited

U.S. PATENT DOCUMENTS

| | | | | |
|---|---|---|---|---|
| 5,374,809 | A | * | 12/1994 | Fox .................... B23K 1/002 <br> 148/573 |
| 5,921,231 | A | * | 7/1999 | Butler .................. B23K 3/022 <br> 126/405 |
| 6,118,934 | A | * | 9/2000 | Tseng .................. A01K 63/065 <br> 219/481 |
| 6,499,907 | B1 | * | 12/2002 | Baur .................... F16B 5/0614 <br> 403/188 |
| 6,875,966 | B1 | * | 4/2005 | Barber .................. B23K 3/04 <br> 219/616 |
| 8,463,115 | B1 | * | 6/2013 | Groves ................. F26B 3/283 <br> 219/229 |
| 8,678,816 | B2 | * | 3/2014 | Sarrazy ................. F23D 14/38 <br> 126/61 |
| D707,804 | S | * | 6/2014 | Gough .................. D23/314 |
| 2004/0016741 | A1 | * | 1/2004 | Evanyk ................. A45D 20/12 <br> 219/221 |
| 2005/0170313 | A1 | * | 8/2005 | Pitz ..................... A61C 5/62 <br> 433/90 |
| 2008/0090193 | A1 | * | 4/2008 | Soanes .................. F26B 3/28 <br> 432/45 |
| 2008/0142164 | A1 | * | 6/2008 | Martinez ............... B29C 65/12 <br> 156/497 |
| 2011/0239483 | A1 | * | 10/2011 | Rotondi ................. F24H 3/0423 <br> 34/487 |
| 2013/0209076 | A1 | * | 8/2013 | Groves .................. F26B 3/283 <br> 392/410 |
| 2014/0202639 | A1 | * | 7/2014 | Martinez ............... B29C 66/1142 <br> 156/499 |
| 2016/0018101 | A1 | * | 1/2016 | Vissa ................... F22B 1/287 <br> 392/308 |

* cited by examiner

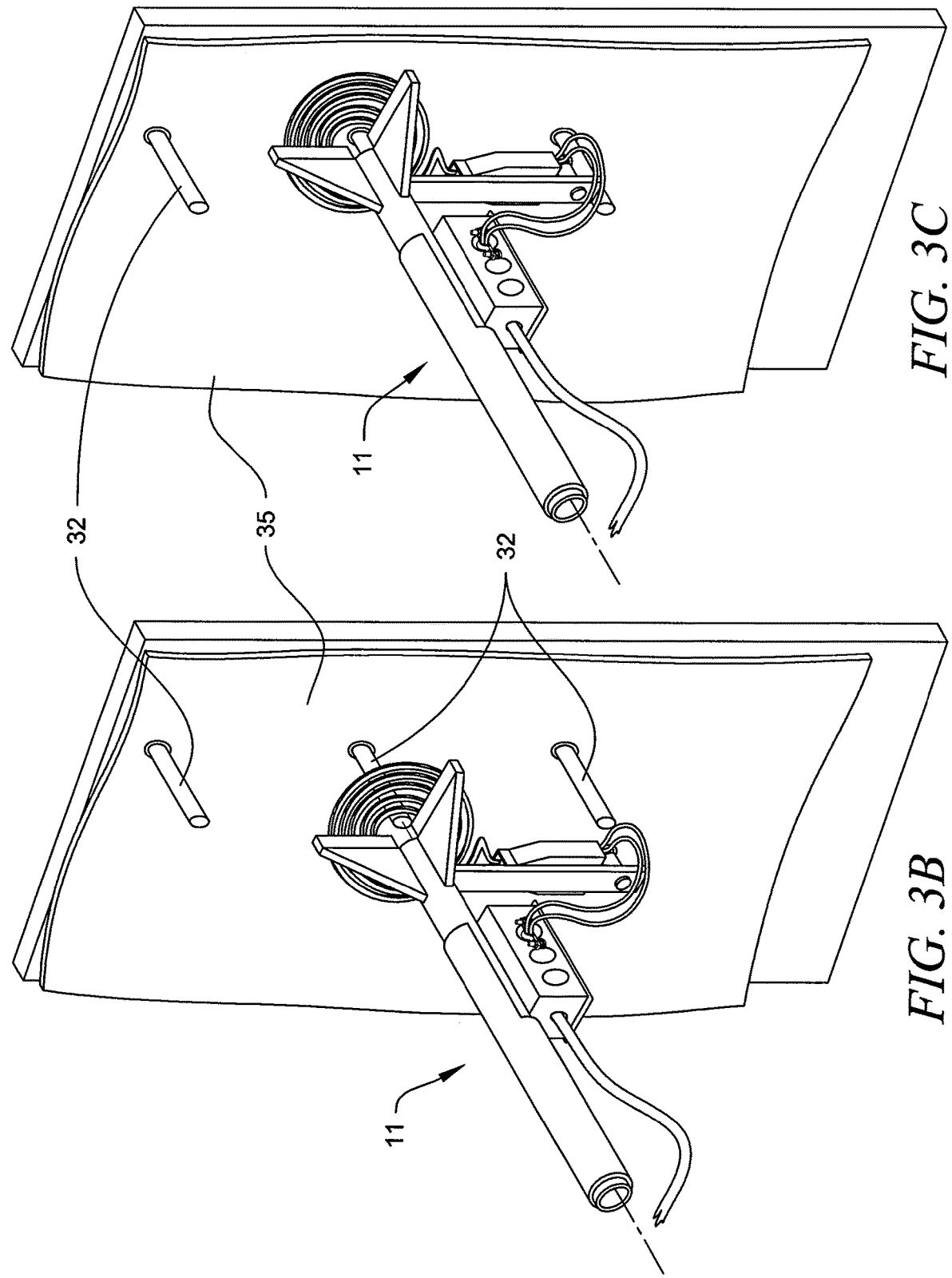

HAND HELD CIRCULAR HEATING ELEMENTS

BACKGROUND OF THE INVENTION

1. Field of the Invention

This invention relates to a device that is a handheld circular heating element for use in the construction industry. More specifically, this invention relates to a handheld circular heating element used for uniformly applying heat to a two-piece membrane for separation of the outer layer of the membrane to allow for the inner layer of the membrane to be exposed.

2. Description of Related Art

Many construction projects necessitate the use of rolled waterproofing membrane that is applied to a wall to prevent moisture penetration through the wall. Certain specific types of rolled waterproofing membrane are comprised of two layers, and in certain construction applications, one of the layers must be removed from the other layer for a myriad of reasons. In these instances, it is generally necessary to pre-warm the area of the membrane for the separation of the outer layer from the inner layer. The heating of the membrane is what allows the two layers to separate, and only the areas of the membrane that are heated will separate.

Heat guns are used extensively in construction projects that require membranes to be separated by heat. However, the use of heat guns to provide the heat for pre-warming the membrane has several drawbacks. Heat guns only provide a small area of heat out of the nozzle. If a large area of a membrane is to be separated, then the worker has to move the heat gun around the area. This process takes a longer time than a process that heats the entire area to be removed at once, and this process of moving the heating gun produces non-uniform results, as some areas receive more heat than others. Also, if a worker desires to remove a specific area or shape from the membrane, then the heat gun has to be precisely moved around the desired area so that too much or too little of the outer layer is not heated and removed.

It is therefore desirable to have a device that provides uniform heat in the shape of pre-determined area to be removed in a quicker manner than with the prior used heat guns.

SUMMARY OF THE INVENTION

The present invention provides for a device that is a handheld circular heating element for use in the construction industry. Specifically the device is useful in applications where uniform heating is necessary to remove the outer layer from a two-piece waterproofing membrane.

The device includes a handle, an electrical supply, an on/off switch and a heating element. The handle allows the user to hold the device and is preferably insulated to prevent the heat from the heating element from burning the user. The handle also serves as the body for the device and provides a location for the mounting of the electrical supply, on/off switch and the heating element. The handle is generally circular in nature to provide a comfortable grip for the user, and preferably is tubular in shape. Mounted to the body portion of the handle is the electrical supply and the on/off switch. The electrical supply comprises an electrical box with an incoming power cord that is wired through the on/off switch, and an outgoing power cord that is wired to the heating element. The on/off switch is mounted to the electrical box and electrically located between the incoming and outgoing power cords. The heating element includes a mounting bracket, receptacle and heat-emitting burner. The mounting bracket connects to the body of the handle and extends perpendicularly therefrom. Attached to the mounting bracket is the receptacle, which is wired directly to the outgoing power cord from the electrical supply. The heat-emitting burner is plugged into the receptacle, which provides the electricity necessary to heat the heat-emitting burner. In practice, the incoming power cord is connected to a power supply, which provides electricity to the electrical supply. When the on/off switch is in the on position, electricity flows from the electrical supply through the outgoing power cord to the heating element receptacle. This electricity then powers to the heat-emitting burner which is plugged into the receptacle, thus providing uniform heat in the shape and size of the heat-emitting burner.

A specific application this device is useful for is the removal of specific-sized circular sections of the outer layer of a waterproofing membrane used on concrete retaining walls. In certain applications, these concrete retaining walls have protruding steel studs called "Nelson" studs, which extend out of the side of the retaining wall that is opposite the earth being retained. These Nelson studs are used as a fastening method for steel structures located on the retaining wall. After the retaining wall, including the Nelson studs, is built, a two-piece waterproofing membrane is installed on the wall to prevent water from passing from the retained earth through the wall into the structure being built. The two-piece membrane contains a PVC layer and an APC layer. The membrane is roughly cut to allow the Nelson studs to protrude through, so that the membrane can be secured directly to the concrete wall. However, if not sealed, these cuts could allow water to seep through around the Nelson studs. To prevent this moisture leak, the APC layer of the membrane must be removed, which exposes the PVC layer of the membrane. Once accessible, a PVC boot sized to fit around the Nelson stud can be chemically welded to the PVC layer to prevent moisture penetration from around the stud. If the APC layer is not heated in a precise, uniform manner, then then the membrane could become ripped which requires additional patching that is time-consuming and costly.

The novel features and construction of the present invention, as well as additional objects thereof, will be understood more fully from the following description when read in connection with the accompanying drawings.

BRIEF DESCRIPTION OF THE DRAWINGS

The improved process of the invention is further described and explained in relation to the following figures of the drawings wherein:

FIGS. 3A-3D are perspective views of the handheld circular heating element of the present invention being used by workers to remove the outer layer of a two-piece membrane on a wall.

Like reference numerals are used to describe like parts in all figures of the drawings.

DESCRIPTION OF THE PREFERRED EMBODIMENTS

Figure 1:
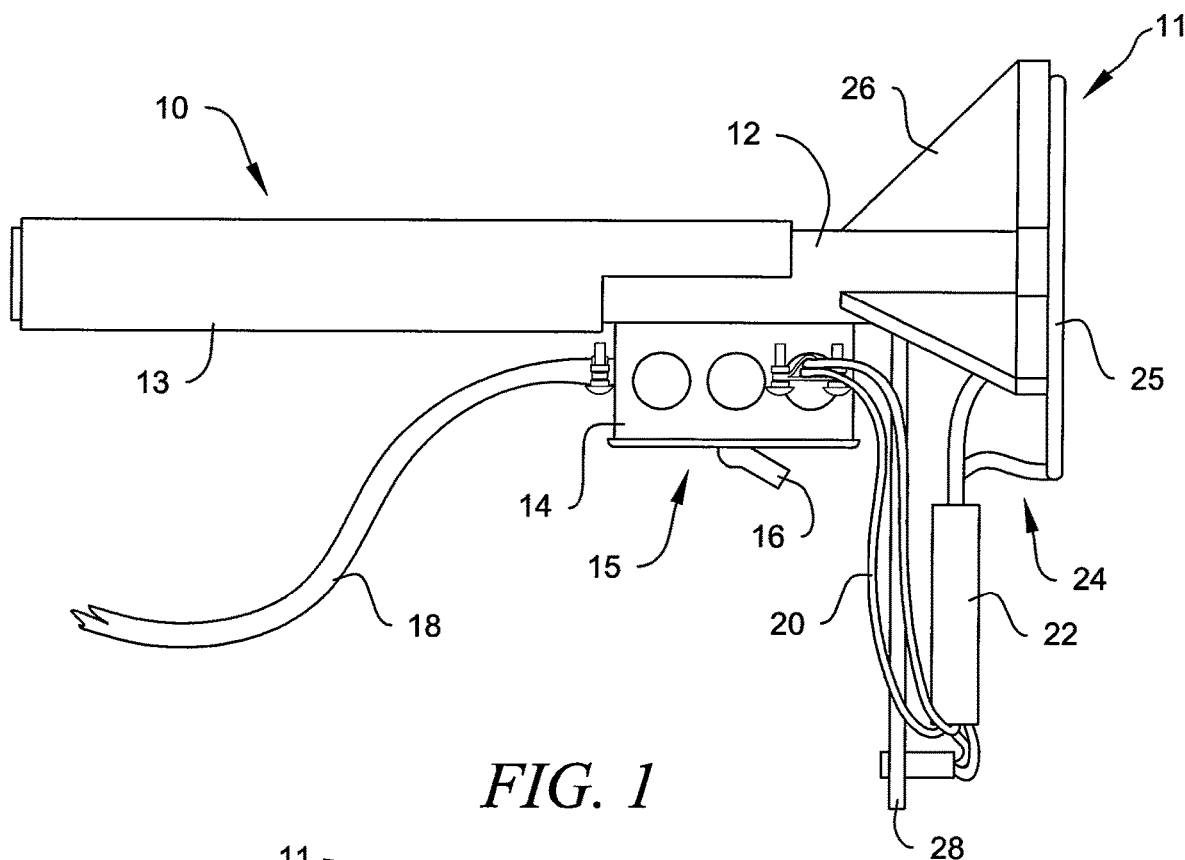
FIG. 1 is a side view of the handheld circular heating element of the present invention.
Figure 2:
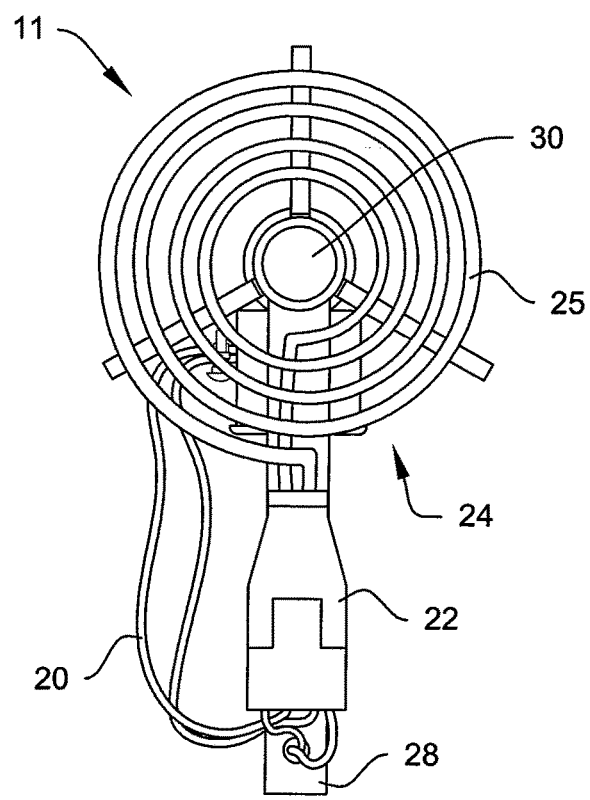
FIG. 2 is a perspective view of the handheld circular heating element of the present invention.

Referring to FIGS. 1 and 2, a handheld circular heating element 11 used in construction projects is shown. In the preferred embodiment, the device comprises handle 10, electrical supply 14, on/off switch 16 and heating element 25. Handle 10 is preferably tubular in shape and has grip portion 13 to allow gripping by the user of the device and body portion 12 to allow mounting of electrical supply 14 and heating element 25. Handle 10 is preferably metal to allow permanent welded connection of heating element flanges 26 and mounting bracket 28 (discussed below) and to provide a more robust and stable base for the other components. It is important that handle 10 is rigid and strong to support the weight of the various components.

Mounted to body portion 12 of handle 10 is electrical supply 14. Electrical supply 14 comprises electrical box 15, which is mounted to body portion 12 of handle 10, along with incoming power cord 18 and outgoing power cord 20. Preferably, incoming power cord 18 and outgoing power cord 20 enter and exit electrical box 15 through holes in the side of electrical box 15 and are secured in place through wire clamps. On/off switch 16 is mounted in electrical box 15 and electrically connected between incoming power cord 18 and outgoing power cord 20. On/off switch 16 controls the flow of electricity from incoming power cord 18 to outgoing power cord 20.

Figure 3A:
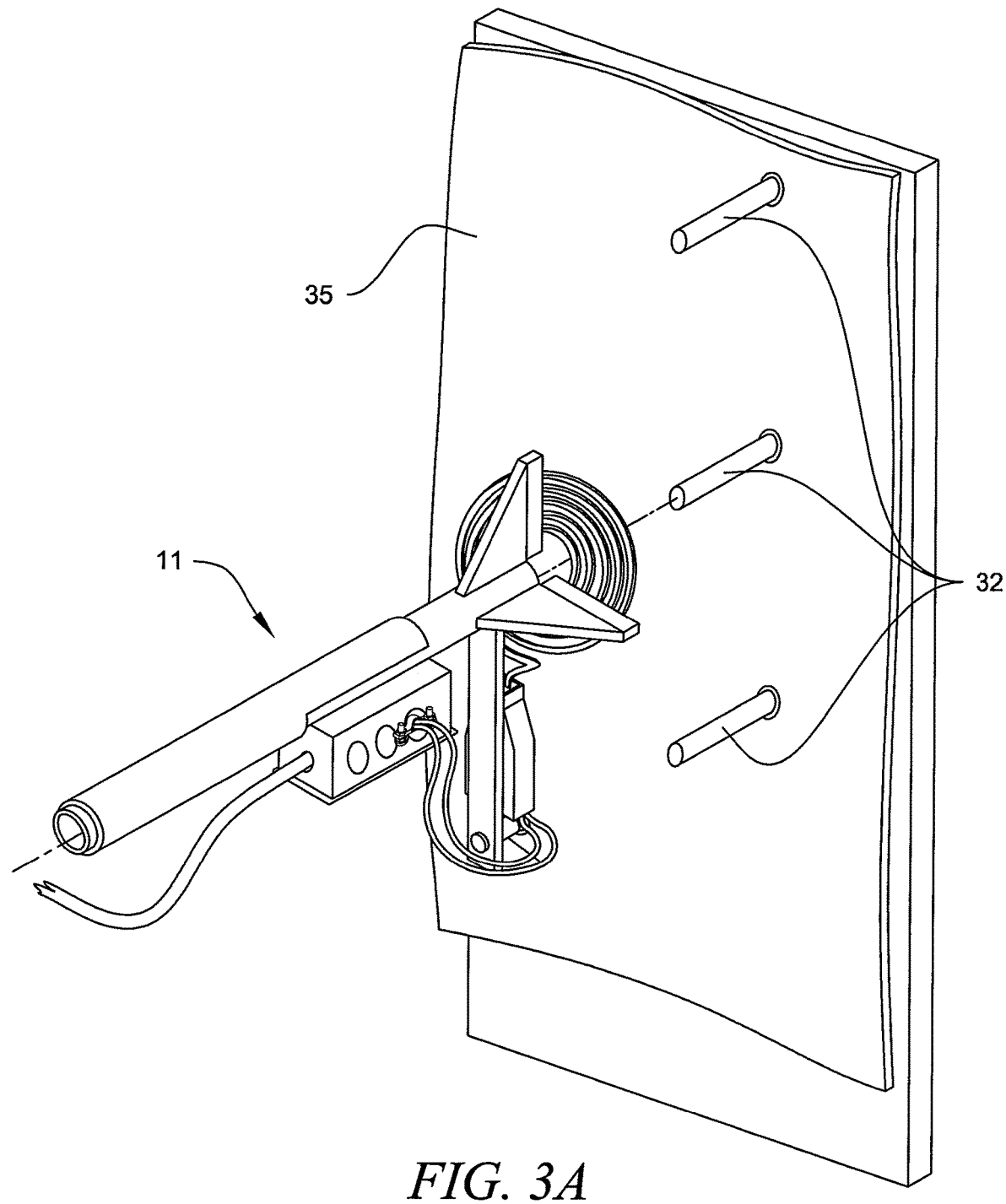
Figure 3D:
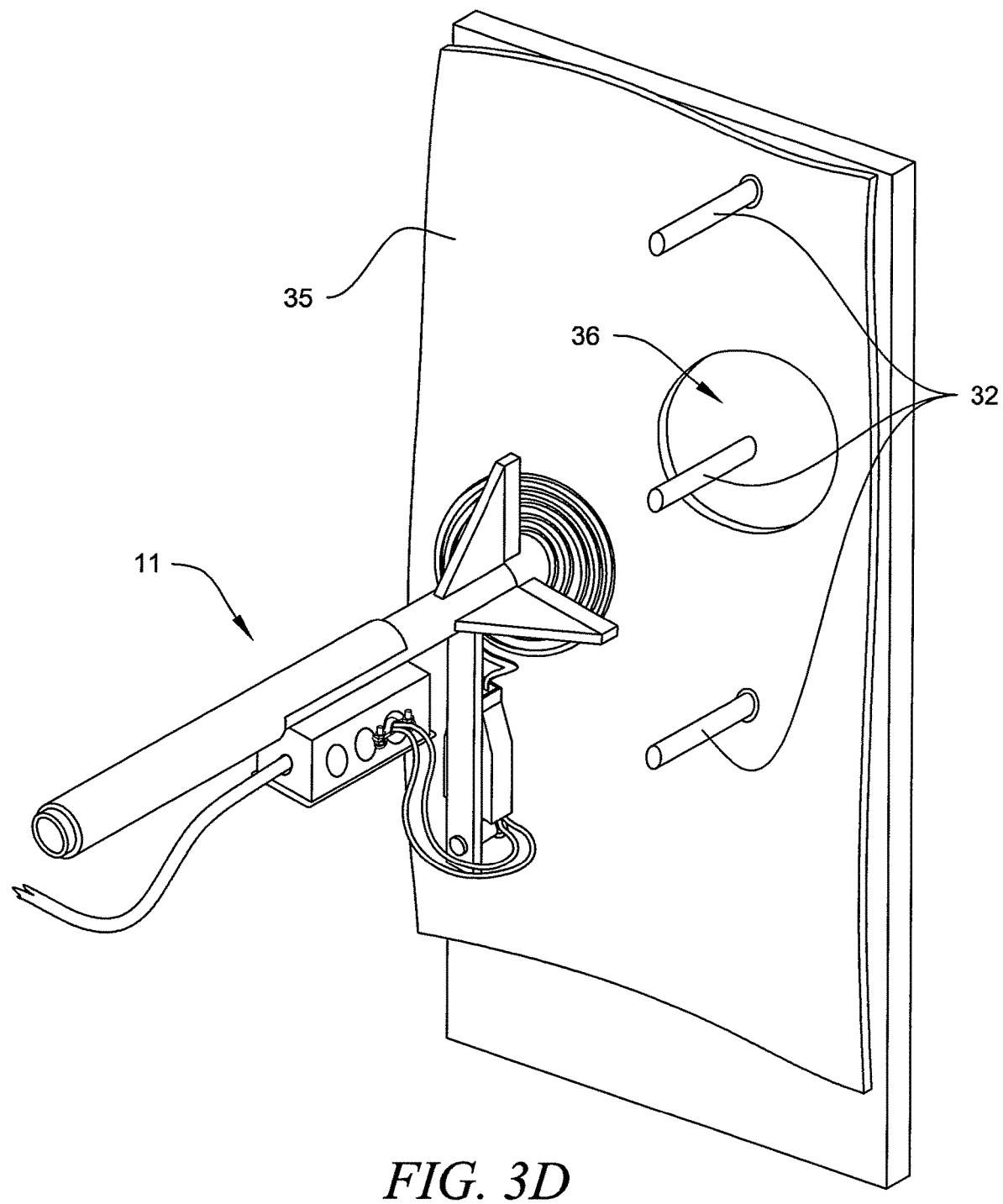

Heating element 25 comprises receptacle 22 and heat-emitting burner 24. Receptacle 22 is electrically connected to outgoing power cord 20, which provides electricity to receptacle 22 when on/off switch 16 is switched to the on position. Heat emitting burner 24 plugs into receptacle 22, and when receptacle 22 is receiving electricity, heat-emitting burner 24 becomes hot. Receptacle 22 is connected to body portion 12 of handle 10 through the use of mounting bracket 28. Mounting bracket 28 is attached to body portion 12 of handle 10 and extends perpendicularly therefrom. The length of mounting bracket 28 is such that it is long enough to provide a secure mounting location for receptacle 22 at the precise location needed for heat-emitting burnerm 24 to plug-in to receptacle 22 and be mounted concentrically with body portion 12 of handle 10. Heat-emitting burner 24 is mounted to body portion 12 of handle 10 through the use of flanges 26. Flanges 26 are preferably triangular in shape and are welded to both heat-emitting burner 24 and body portion 12 of handle 10. This welding provides a rigid connection of heat-emitting burner 24 to handle 10 and allows for precise control of placement of heat-emitting burner 24. Heat-emitting burner 24 is preferably circular in nature and is formed as a concentric spiral shape where the diameter of each ring of heat-emitting burner decreases uniformly as it nears the center. Hole 30 is located in the center of heat-emitting burner 24, which is aligned with the open center of tubular body portion 12 of handle 10. This allows handheld circular heating element 11 to be placed over Nelson stud 32 during operation of the device (discussed below in reference to FIG. 3).

Referring to FIGS. 3A-3D, handheld circular heating element 11 is shown in use in an exemplary application. This application shown is for use on a concrete retaining wall that has Nelson studs 32 protruding therefrom, which are used as anchors for a fastening method of attaching steel structures to the wall. Waterproof membrane 35 has been placed on the wall and holes have been cut (not shown) in waterproof membrane 35 for Nelson studs 32 to protrude through such that membrane 35 can be affixed directly to the wall. Holes cut in membrane 35 must be sealed to prevent moisture from passing through the wall and into the interior space. In this application, membrane 35 is a two-piece membrane with an underlying PVC layer and an overlying APC layer. One method for sealing the holes in membrane 35 is to remove the overlying APC layer and chemically weld PVC sealing boots to the underlying PVC layer of membrane 35.

To accomplish this removal of the overlying APC layer, handheld circular heating element 11 is used. First, the operator switches on/off switch 16 to the on position, which provides electricity to receptacle 22. Heat-emitting burner 25 begins warming uniformly due to its concentric spiral shape. When heat-emitting burner 25 has reached the desired temperature, the operator places handheld circular heating element 11 into position by sliding the device over Nelson stud 32, which fits into hole 30 of heat-emitting burner 25 and then into tubular body 12 of handle 10. This placement allows heat-emitting burner to be placed directly adjacent to membrane 35. When the overlying APC layer has been heated sufficiently, typically within 20-30 seconds, the operator removes handheld circular heating element 11 from Nelson stud 32 and switches the device off. Because of the design, he can hang the device on an adjacent Nelson stud 32 while he works to remove the circular section of the overlying APC layer that was warmed, which leaves hole 36 in the overlying APC layer. This removal allows access to the underlying PVC layer, such that a PVC boot can be chemically welded in place to seal the hole in membrane 35 around the Nelson stud 32 protrusion. For the exemplary application, a round heat-emitting burner is desired due to the circular shape of the PVC boot. However, it should be understood that heat-emitting burner 25 could take any shape if a certain application necessitates certain shapes to be removed. Such shapes could include diamond, triangular or rectangular.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. A handheld heating device comprising:
   a handle having a proximal end and a distal end, the handle having an elongated hollow portion at least at the distal end of the handle, the elongated hollow portion having an opening at the distal end of the handle, the elongated hollow portion being configured sized to receive a weld stud fastener therein to enable removal of a layer of a waterproofing membrane used on a wall having the weld stud fastener;
   a power supply coupled to the handle, the power supply configured to supply electrical power;
   a heating element electrically coupled to the power supply, physically coupled to the handle without blocking the opening, and positioned at the distal end of the handle, the heating element configured to heat when receiving the electrical power; and
   a receptacle physically coupled to the handle and electrically coupled via a plug to the heating element, the receptacle configured to receive the electrical power from the power supply through a power cord and configured to provide the electrical power to the heating element.

2. The handheld heating device of claim 1, wherein the handle has a tubular shape.

3. The handheld heating device of claim 1, further comprising an electrical switch electrically located between the power supply and the heating element.

4. The handheld heating device of claim 1, wherein the handle includes metal.

5. The handheld heating device of claim 4, wherein the heating element is welded to the handle.

6. The handheld heating device of claim 1, wherein the handle is hollow from the proximal end to the distal end.

7. The handheld heating device of claim 6, wherein the handle has another opening at the proximal end.

8. The handheld heating device of claim 1, further comprising a grip over the handle.

9. The handheld heating device of claim 1, further comprising flanges coupled to the handle, and wherein the heating element is coupled the flanges.

10. The handheld heating device of claim 9, wherein the flanges include three flanges.

11. The handheld heating device of claim 10, wherein the heating element has a spiral shape.

12. The handheld heating device of claim 1, wherein the heating element has a round perimeter.

\* \* \* \* \*

UNITED STATES PATENT AND TRADEMARK OFFICE
CERTIFICATE OF CORRECTION

Page 1 of 1

PATENT NO. : 10,730,279 B2
APPLICATION NO. : 14/694711
DATED : August 4, 2020
INVENTOR(S) : Moug et al.

It is certified that error appears in the above-identified patent and that said Letters Patent is hereby corrected as shown below:

In the Claims

Claim 1, Column 4, Line 45:
"sized to receive a weld stud fastener therein to enable"
Should read:
-- to receive a weld stud fastener therein to enable --

Signed and Sealed this
Twenty-second Day of September, 2020

Andrei Iancu
*Director of the United States Patent and Trademark Office*